US012809240B2

(12) United States Patent
Ahn et al.

(10) Patent No.: US 12,809,240 B2
(45) Date of Patent: Nov. 24, 2026

(54) PROJECTION DEVICE AND VEHICLE EQUIPPED WITH THE SAME

(71) Applicant: HYUNDAI MOBIS CO., LTD., Seoul (KR)

(72) Inventors: Sung Joon Ahn, Seoul (KR); Kyung Hoon Kim, Seongnam-si (KR); Hyun Jun An, Gunpo-si (KR); Jun Lee, Yongin-si (KR); Shin Jik Lee, Hwaseong-si (KR); Ji Soo Shin, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 287 days.

(21) Appl. No.: 18/620,143

(22) Filed: Mar. 28, 2024

(65) Prior Publication Data

US 2025/0053072 A1 Feb. 13, 2025

(30) Foreign Application Priority Data

Aug. 8, 2023 (KR) ........................ 10-2023-0103335

(51) Int. Cl.
*G03B 21/14* (2006.01)
*G03B 21/56* (2006.01)

(52) U.S. Cl.
CPC ........... *G03B 21/145* (2013.01); *G03B 21/56* (2013.01)

(58) Field of Classification Search
CPC ........ G03B 21/00; G03B 21/10; G03B 21/14; G03B 21/56; G03B 21/145; H04N 9/3135; H04N 9/3141
See application file for complete search history.

(56) References Cited

U.S. PATENT DOCUMENTS 9,690,098 B1 * 6/2017 Kuo ................... G02B 27/0149
2008/0014995 A1 * 1/2008 Noba .................. H04M 1/0272 455/566
2009/0036158 A1 * 2/2009 Fujinawa ............. H04N 9/3185 455/556.1
2009/0141245 A1 * 6/2009 Nozaki ................ G03B 21/142 353/122
2018/0217381 A1 * 8/2018 Mitani ............... G02B 27/0172
2018/0217682 A1 * 8/2018 Dangy Caye .......... G04G 21/08
2019/0126824 A1 * 5/2019 Oba ........................ E05F 15/70

* cited by examiner

*Primary Examiner* — Sultan Chowdhury
(74) *Attorney, Agent, or Firm* — Morgan Lewis & Bockius LLP

(57) ABSTRACT

A projection device mounted on a vehicle may include a display panel, a rotation bezel positioned to divide the display panel, a driving unit connected to the rotation bezel and rotating the rotation bezel, and a projector located behind the rotation bezel and projecting an image or a video. The rotation bezel may be located parallel to a front surface of the display panel in a first mode, and may be bent at a predetermined angle or more with the front surface of the display panel and expose the projector in a second mode. The projection device may project an image or a video onto the rotation bezel or a headlining of the vehicle through the projector located behind the rotation bezel by rotation of the rotation bezel.

19 Claims, 13 Drawing Sheets

FIG. 6B
120
Navigation
Telematics
Voice search
U tisty
Multimedia
Radio
Setup
Info

PROJECTION DEVICE AND VEHICLE EQUIPPED WITH THE SAME

CROSS-REFERENCE TO RELATED APPLICATION(S)

This application claims the benefit of Korean Patent Application No. 10-2023-0103335, filed on Aug. 8, 2023, which is hereby incorporated by reference as if fully set forth herein.

BACKGROUND

1. Field

The disclosure is applicable to a vehicle in any field, and relates to a projection device which includes a projector disposed behind a rotation bezel positioned to divide a display panel and is capable of projecting an image or a video onto the rotation bezel or a headlining of a vehicle by rotating the rotation bezel, and a vehicle equipped with the projection device.

2. Description of Related Art

A center fascia display of a vehicle may display various visual information about the vehicle. Such a display device may also be installed on a dashboard of a vehicle disposed in front of a driver's seat and a front occupant seat, and provides various convenience information such as navigation, vehicle management and operation, Internet, and entertainment. A display device provides the above-described information and includes a display panel for displaying an image.

Recently, research on advanced driver assistance systems (ADAS) has been actively conducted to ensure driving convenience for vehicle users, and autonomous vehicles are under active development. Accordingly, the demand for devices that provide various pieces of information to vehicles in a variety of ways has been increasing.

Generally, a projector is a device that connects to a computer or a projection device and displays an image by converting an electrical image signal to an optical signal and projecting it onto a screen. Such projectors have been used mainly in offices and homes.

Along with the development of the ADAS and technologies for autonomous vehicles as described above, more attempts have been made to use a projector in a vehicle to provide various pieces of information or entertainment to occupants including a driver during driving of the vehicle.

However, when a projector is used in a vehicle, the visibility of an image projected through the projector may be degraded if the focal length of the projector is not correct. Moreover, since a separate space is required to install the projector in the vehicle, there are space limitations.

Therefore, there is a need for a means that provides various pieces of information to a vehicle through a projector in various manners, while solving the above-described problems.

SUMMARY

The disclosure is intended to provide a projection device and a vehicle equipped with the same. More specifically, the disclosure is intended to provide a projection device which includes a projector disposed behind a rotation bezel positioned to divide a display panel, and is capable of projecting an image or a video onto the rotation bezel or a headlining of a vehicle by rotating the rotation bezel, and a vehicle equipped with the projection device.

In addition, the disclosure is intended to provide a projection device which may efficiently secure a projector installation space inside a vehicle by positioning a projector on a mounting part of the vehicle and exposing the projector through rotation of a rotation bezel, and a vehicle equipped with the projection device.

The problems to be solved by the disclosure are not limited to the technical problems mentioned above, and other technical problems not mentioned will be clearly understood by those skilled in the art from the following description.

A projection device mounted on a vehicle is provided, including a display panel, a rotation bezel positioned to divide the display panel, a driving unit connected to the rotation bezel and rotating the rotation bezel, and a projector located behind the rotation bezel and projecting an image or a video. The rotation bezel is located parallel to a front surface of the display panel in a first mode, and is bent at a predetermined angle or more with the front surface of the display panel and exposes the projector in a second mode.

The driving unit may include a rotation arm having an end coupled to the rotation bezel, and a driving motor hinged to another end of the rotation arm.

The driving unit may include a guide rail engaged with the one end of the rotation arm and guiding rotation of the rotation arm.

A focal length of the projector may be adjusted to allow an image or a video projected onto the rotation bezel to be visually recognizable to an occupant.

The projector may define a plurality of divided areas, and project the image or the video onto a specific area among the plurality of areas.

The projector may form a black area in a remaining area except for the specific area among the plurality of divided areas.

The rotation bezel may include a touch sensing device detecting a touch of an occupant.

A focal length of the projector may be adjusted to allow an image or a video projected onto a headlining of the vehicle to be visually recognizable to an occupant in the second mode.

The projector may be adjusted to make a size and an angle of an image or a video projected onto the rotation bezel in the first mode different from a size and an angle of an image or a video projected on the headlining in the second mode.

A vehicle is provided, including a vehicle body, a mounting part located on the vehicle body, and a projection device mounted on the mounting part. The projection device includes a display panel, a rotation bezel positioned to divide the display panel, a driving unit connected to the rotation bezel and rotating the rotation bezel, and a projector located behind the rotation bezel and projecting an image or a video. The rotation bezel is located parallel to a front surface of the display panel in a first mode, and is bent at a predetermined angle or more with the front surface of the display panel and exposes the projector in a second mode.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Description will now be given in detail according to exemplary embodiments disclosed herein, with reference to the accompanying drawings. The same or equivalent components may be provided with the same reference numbers, and description thereof will not be repeated. As used herein, the suffixes "module" and "part" are added or used interchangeably to facilitate preparation of this specification and are not intended to suggest distinct meanings or functions. In describing embodiments disclosed in this specification, relevant well-known technologies may not be described in detail in order not to obscure the subject matter of the embodiments disclosed in this specification. In addition, it should be noted that the accompanying drawings are only for easy understanding of the embodiments disclosed in the present specification, and should not be construed as limiting the technical spirit disclosed in the present specification. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, it will be understood that when an element is referred to as being "directly connected with" another element, there are no intervening elements present.

A singular representation may include a plural representation unless it represents a definitely different meaning from the context.

The terms such as "include" or "have" used herein are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Figure 1:
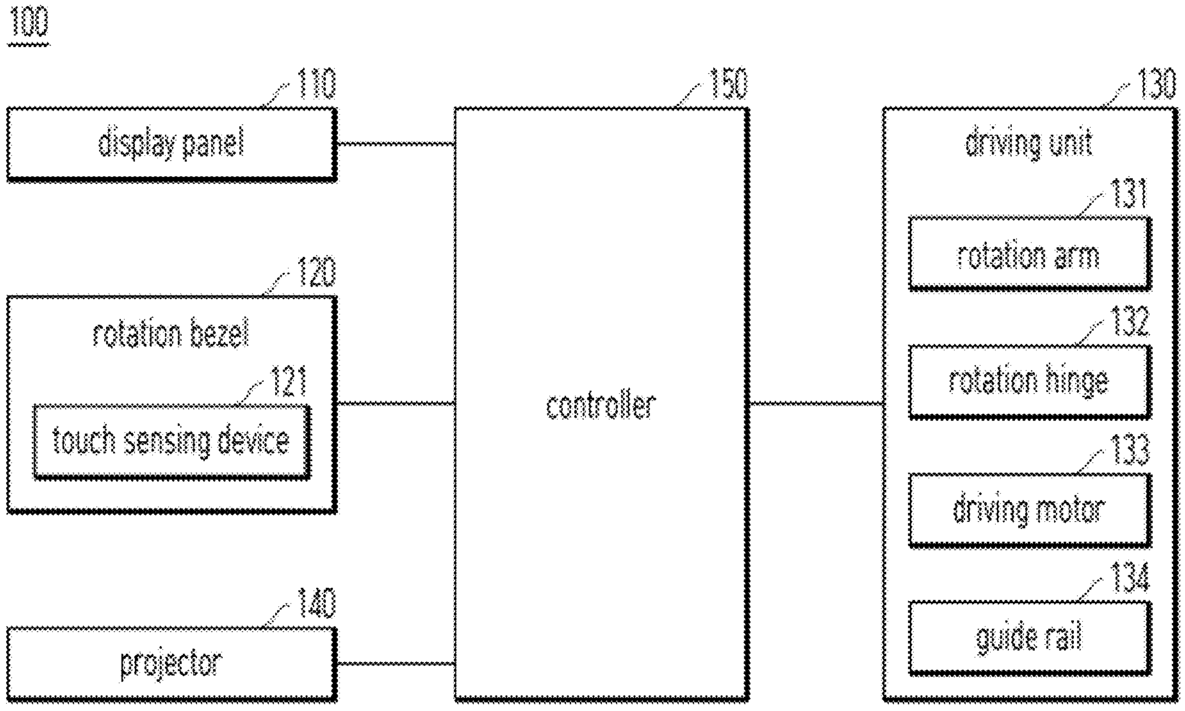
FIG. 1 is a block diagram illustrating a projection device according to an embodiment of the disclosure.

FIG. 1 is a block diagram illustrating a projection device 100 according to an embodiment of the disclosure. FIG. 2 is a diagram illustrating a first mode and a second mode according to rotation of a rotation bezel 120 in the projection device 100 according to an embodiment of the disclosure. FIG. 3 is a diagram illustrating rotation of the rotation bezel 120 through driving of a driving unit 130 in the projection device 100 according to an embodiment of the disclosure. FIG. 4 is a diagram illustrating another embodiment of the driving unit 130 in the projection device 100 of the disclosure.

The projection device 100 according to an embodiment of the disclosure may include a display panel 110, the rotation bezel 120, the driving unit 130, and a projector 140. As described above, the display panel 110 may provide various pieces of convenient information such as navigation, vehicle management and operation, Internet, and entertainment, and display an image.

Figure 2A:
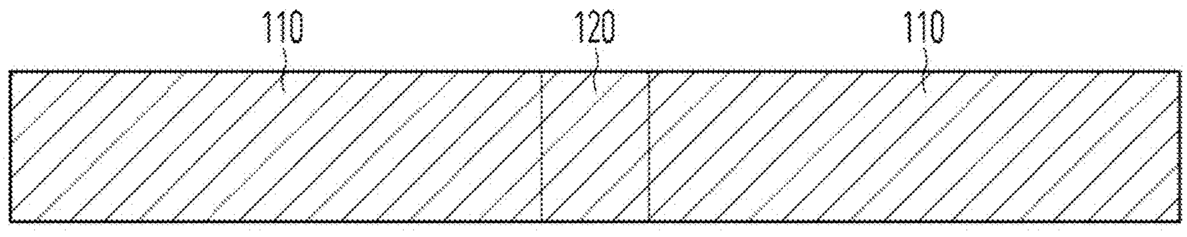
FIGS. 2A and 2B are diagrams illustrating a first mode and a second mode according to rotation of a rotation bezel in a projection device according to an embodiment of the disclosure.

The rotation bezel 120 may be positioned to divide the display panel 110, as illustrated in FIG. 2. Further, as illustrated in FIG. 2A, the rotation bezel 120 may have a front surface in the same shape as the display panel 110 in order to provide a sense of unity with the display panel 110.

The driving unit 130 may be connected to the rotation bezel 120 and function to rotate the rotation bezel 120. Further, the projector 140 may be located behind the rotation bezel 120 and project an image or a video.

Particularly, the projection device 100 according to an embodiment of the disclosure may project an image or a video through the projector 140 onto the rotation bezel 120 or a headlining of a vehicle by rotating the rotation bezel 120 through the driving unit 130.

Figure 2B:
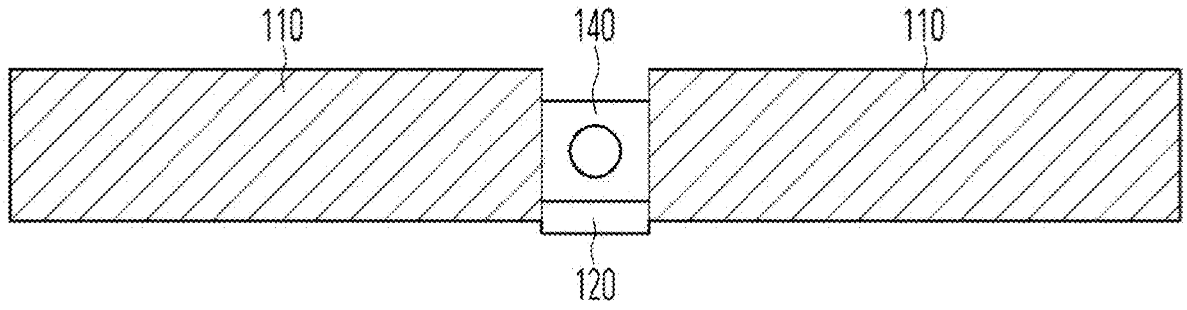

More specifically, the rotation bezel 120 may be positioned parallel to the front surface of the display panel 110 in the first mode, as illustrated in FIG. 2A. In the second mode set by rotation of the rotation bezel 120, the rotation bezel 120 may be bent at a predetermined angle or more with the front surface of the display panel 110. In the second mode, the projector 140 may be exposed by the rotation of the rotation bezel 120. The predetermined angle may refer to an angle at which the projector 140 may be exposed by the rotation of the rotation bezel 120. In an embodiment, the rotation bezel 120 may be positioned perpendicular to the front surface of the display panel 110 and expose the projector 140 in the second mode, as illustrated in FIG. 2B.

Therefore, the projection device 100 according to an embodiment of the disclosure is capable of switching to the first mode or the second mode through rotation of the rotation bezel 120, thereby efficiently securing an installation space for the projector 140 inside the vehicle.

Further, the projection device 100 according to an embodiment of the disclosure may project an image or a video onto the rotation bezel 120 through the projector 140 in the first mode. The rotation bezel 120 may include a touch sensing device 121 that detects a touch of an occupant. In the second mode, an image or a video may be projected onto the headlining of the vehicle through the projector 140. More specific details will be described later.

The touch sensing device 121 may be an input/output means for detecting a touch of an occupant on the front surface of the rotation bezel 120, receiving information about the position of the detected touch, and providing overall control to the vehicle, including control of the display panel 110.

In an embodiment of the disclosure, the touch sensing device 121 may detect a touch in a capacitive scheme using capacitor charging and discharging characteristics. The capacitive scheme, which uses capacitance in an occupant's body, may include a scheme of detecting a touch by measuring a change in resistance and current caused by the capacitance of an occupant, based on an alternating current (AC) voltage, and a scheme of determining the presence or absence of a touch by comparing the amounts of charges in a capacitor.

The driving unit 130 may include a rotation arm 131, a rotation hinge 132, a driving motor 133, and a guide rail 134. Referring to FIG. 3, one end of the rotation arm 131 may be coupled to the rotation bezel 120. The driving motor 133 hinged to the other end of the rotation arm 131 through the rotation hinge 132 may be located at the other end of the rotation arm 131.

Figure 3A:
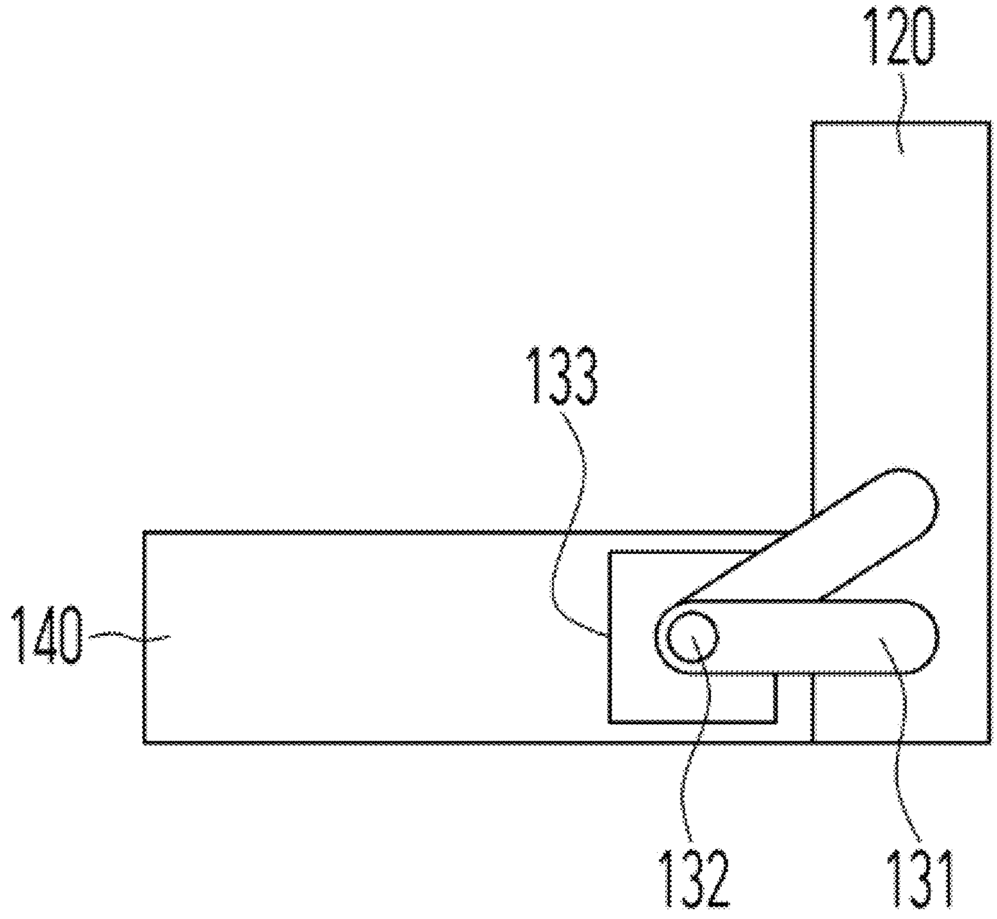
FIGS. 3A and 3B are diagrams illustrating rotation of a rotation bezel through driving of a driving unit in a projection device according to an embodiment of the disclosure.
Figure 3B:
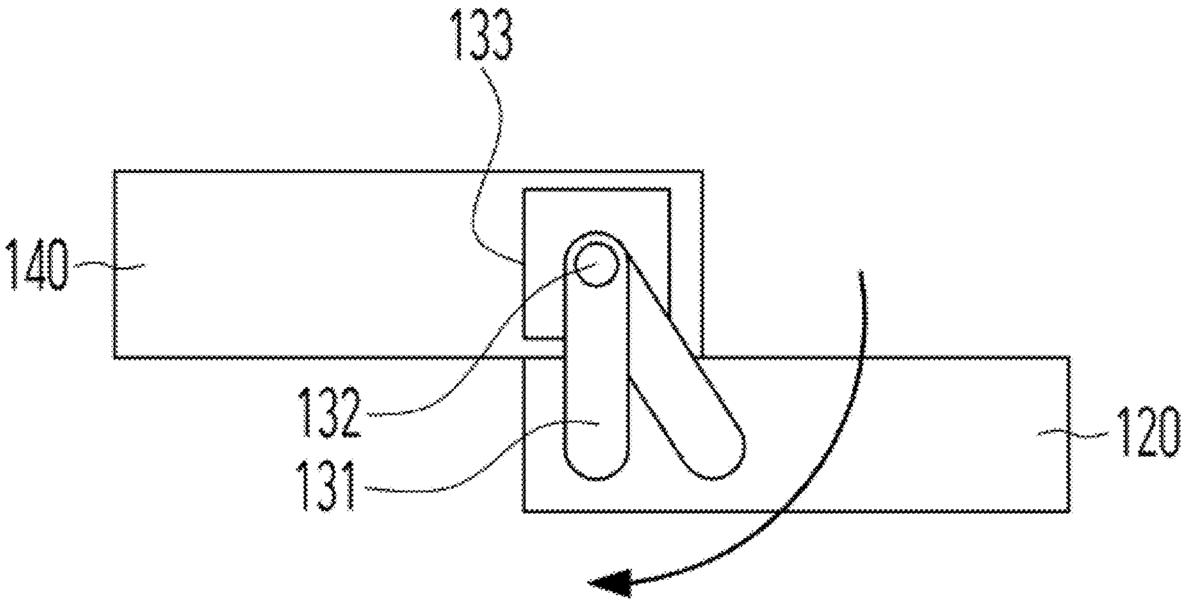

Therefore, the projection device 100 according to an embodiment of the disclosure may rotate the rotation arm 131 through driving of the driving motor 133 in the first mode, as illustrated in FIG. 3A, and switch to the second mode through rotation of the rotation arm 131 and the rotation bezel 120, as illustrated in FIG. 3B.

FIG. 4 is a diagram illustrating another embodiment of the driving unit 130 in the projection device 100 of the disclosure, in which the driving motor 133 is an actuator capable of rotating the rotation arm 131.

Figure 4A:
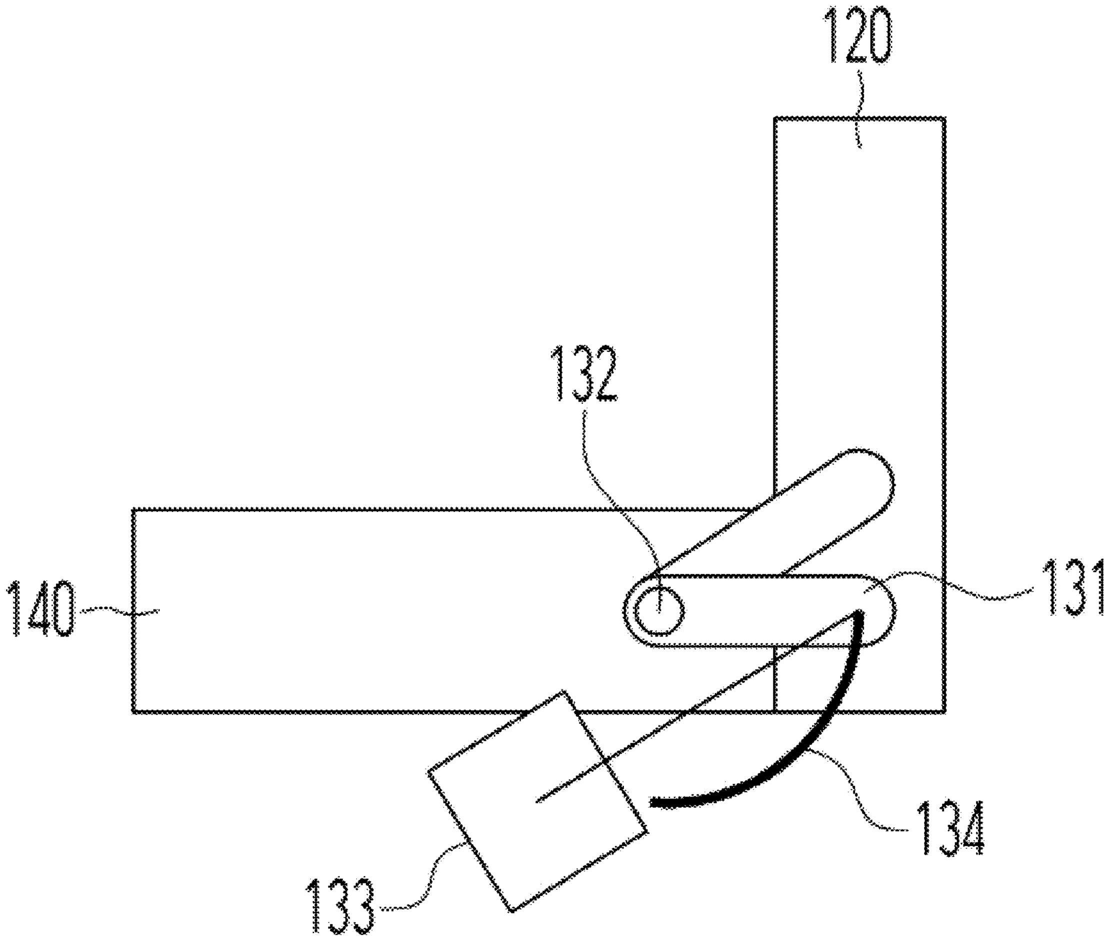
FIGS. 4A and 4B are diagrams illustrating another embodiment of a driving unit in a projection device of the disclosure.
Figure 4B:
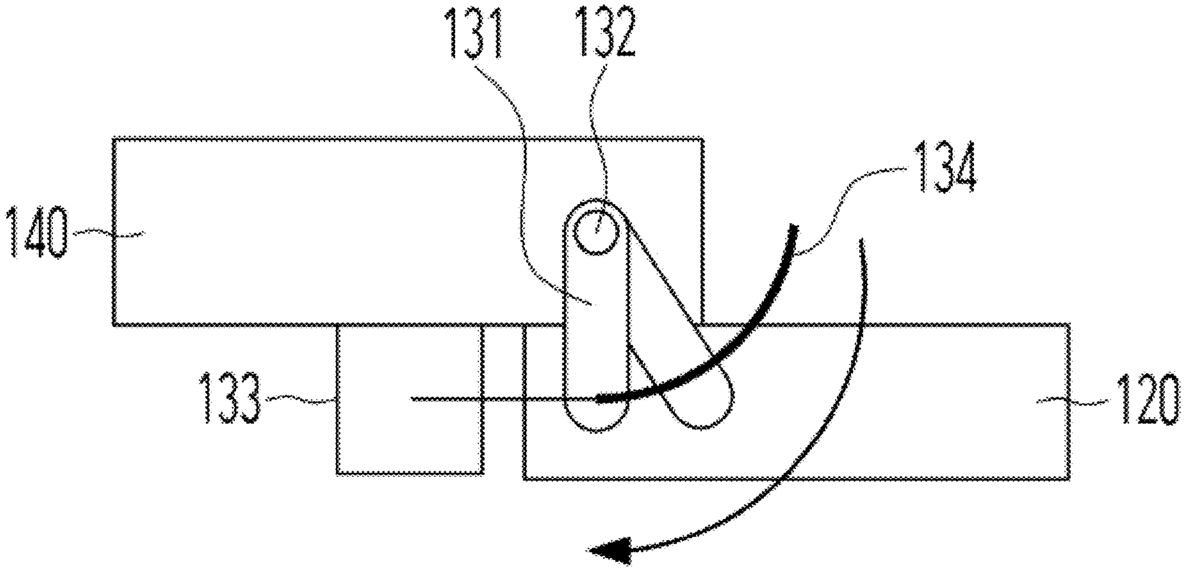

As illustrated in FIG. 4A, one end of the actuator may be coupled to one end of the rotation arm 131, and the rotation arm 131 may be rotated by driving the actuator. Therefore, as illustrated in FIG. 4B, the second mode may be switched to through rotation of the rotation arm 131 and the rotation bezel 120.

Further, in the projection device 100 according to an embodiment of the disclosure, the driving unit 130 may include the guide rail 134 which is engaged with one end of the rotation arm 131 and guides the rotation of the rotation arm 131.

In addition, there may be a plurality of rotation arms 131 to be stably coupled to the rotation bezel 120, as illustrated in FIGS. 3 and 4, and in this case, each of the plurality of rotation arms 131 may have one end coupled to the rotation bezel 120 and the other end coupled to the rotation hinge 132.

The projection device 100 according to an embodiment of the disclosure may further include a controller 150 for driving the display panel 110, the rotation bezel 120, the driving unit 130, and the projector 140. The controller 150 of the projection device 100 according to an exemplary embodiment of the present disclosure may be a processor (e.g., computer, microprocessor, CPU, ASIC, circuitry, logic circuits, etc.), and may be implemented by a non-transitory memory storing, e.g., a program(s), software instructions reproducing algorithms, etc., which, when executed by the processor, provides the functionalities of the display panel 110, the rotation bezel 120, the driving unit 130, and the projector 140. For example, the controller 150 may control on and off of the display panel 110 and on and off of the projector 140, and rotate the rotation bezel 120 by controlling the driving motor 133 of the driving unit 130. Through this operation, the first mode or the second mode may be switched to.

The block diagram of the projection device 100 in FIG. 1 is only for an embodiment of the disclosure, and each component of the block diagram may be integrated or omitted, or another component may be added according to the specifications of the projection device 100 that is actually implemented.

That is, two or more components may be combined into one component, or one component may be subdivided into two or more components, as needed. In addition, functions performed in each block are for describing an embodiment of the disclosure, and specific operations or devices thereof do not limit the scope of the disclosure.

FIGS. 5 and 6 are diagrams illustrating an image 141 projected in the first mode of the projection device 100 according to an embodiment of the disclosure. FIG. 7 is a diagram illustrating an image 142 projected in the second mode of the projection device 100 according to an embodiment of the disclosure.

In the projection device 100 according to an embodiment of the disclosure, the focal length of the projector 140 may be adjusted such that an image or a video projected onto the rotation bezel 120 in the first mode is visually recognizable to an occupant.

This is because the focal length of the projector 140 may cause a problem and an image or a video projected onto the rotation bezel 120 may be blurred due to a small distance between the rotation bezel 120 and the projector 140.

Accordingly, in the projection device 100 according to an embodiment of the disclosure, the projector 140 may define a plurality of divided areas and project an image or a video onto a specific area 141*a* among the plurality of areas. The projector 140 may form a black area 141*b* in a remaining area except for the specific area 141*a* among the plurality of divided areas.

Figure 5A:
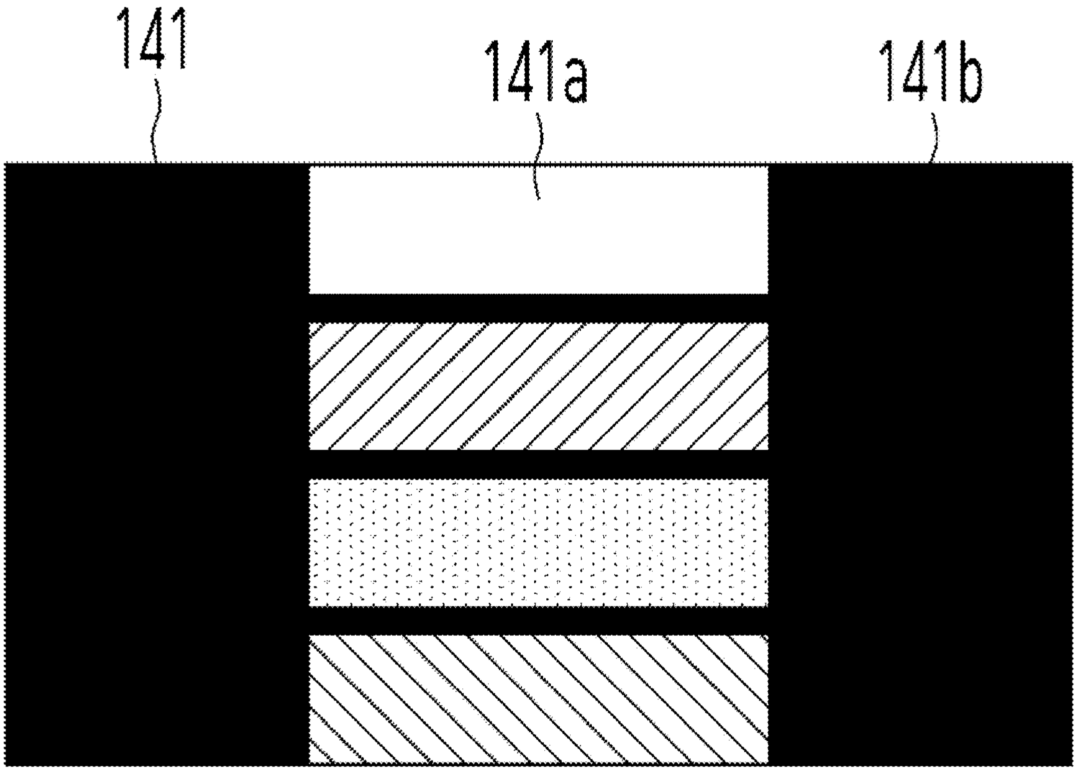
FIGS. 5A, 5B, 6A and 6B are diagrams illustrating images projected in a first mode in a projection device according to an embodiment of the disclosure.
Figure 5B:
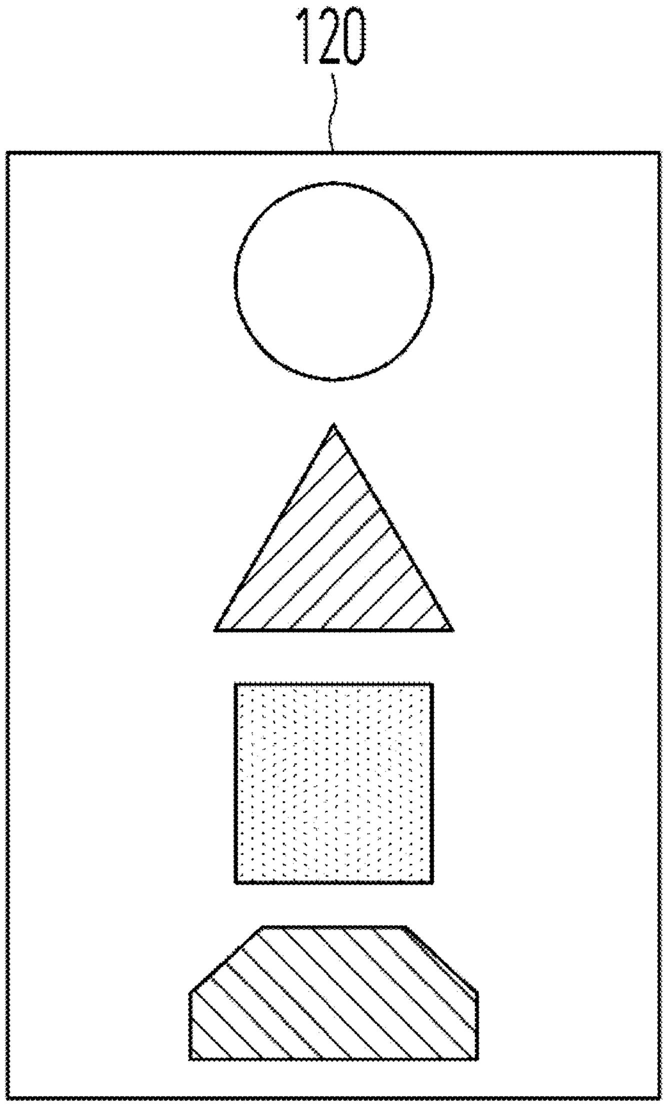

That is, as illustrated in FIG. 5A, an image may be projected onto the specific area 141*a*, and the black area 141*b* may be formed on the remaining area, in the image 141 projected in the first mode. Therefore, an image visually recognizable to an occupant may be formed on the rotation bezel 120, as illustrated in FIG. 5B. Further, the image formed on the rotation bezel 120 may minimize light blurring despite a small distance between the rotation bezel 120 and the projector 140.

Figure 6A:
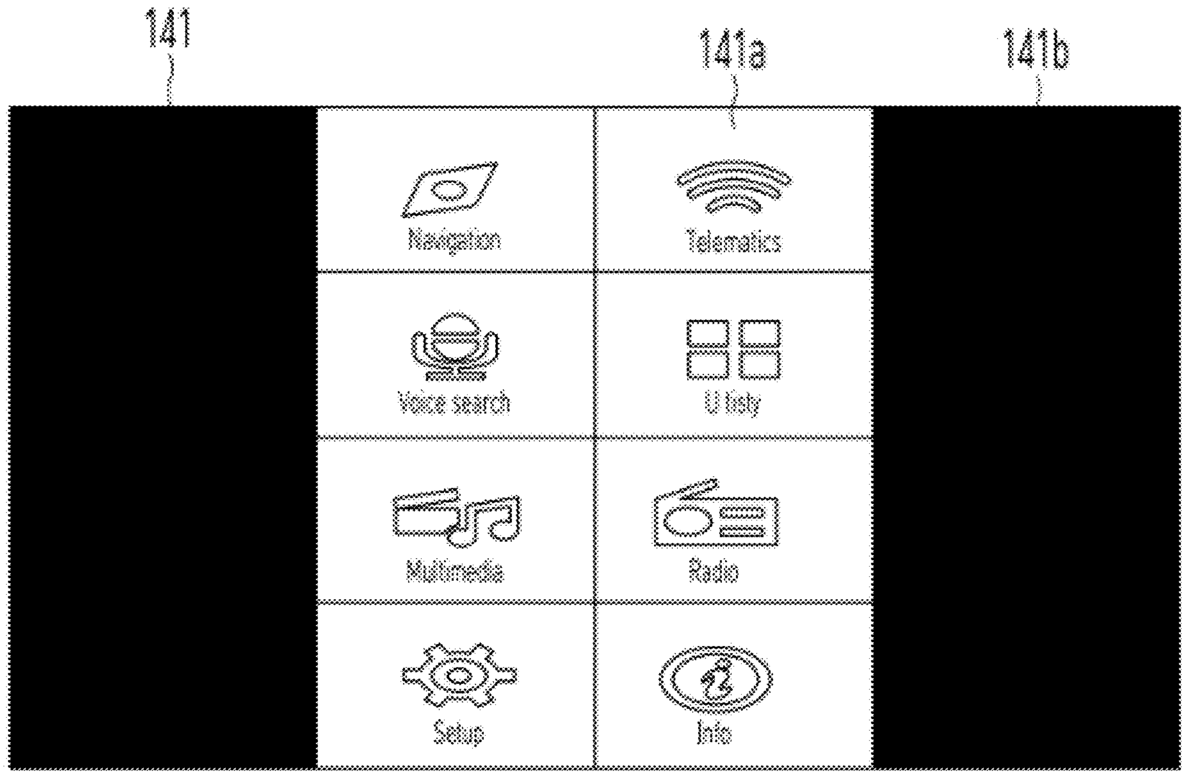
Figure 6B:
Figure 7:
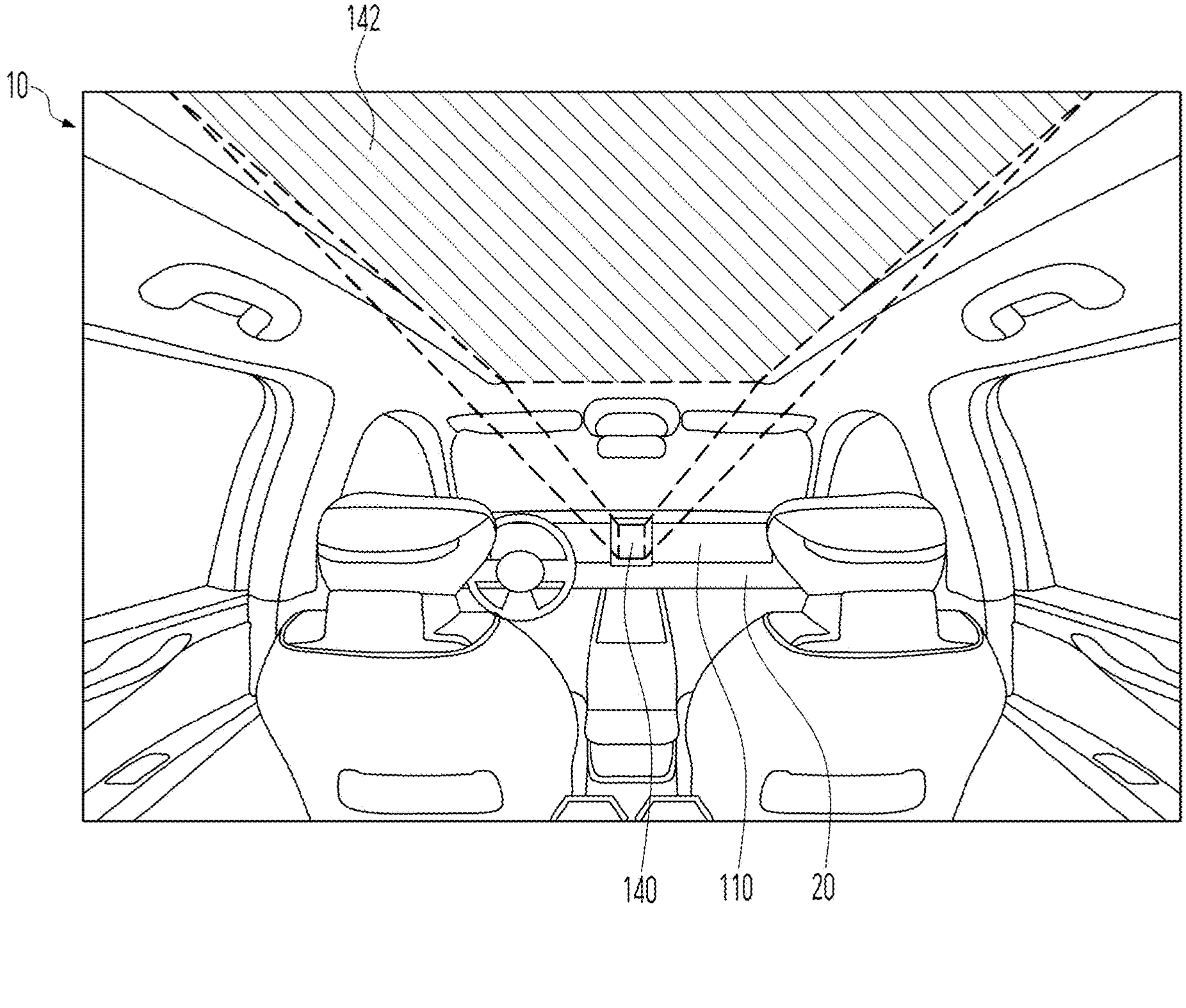
FIG. 7 is a diagram illustrating an image projected in a second mode in a projection device according to an embodiment of the disclosure.

Likewise, as illustrated in FIG. 6A, images may projected onto the specific area 141*a*, and the black area 141*b* may be formed in a remaining area, in the image 141 projected in the first mode, as described above with reference to FIG. 5. Therefore, images visually recognizable to an occupant may be formed on the rotation bezel 120, as illustrated in FIG. 6B.

As described above with reference to FIG. 1, the rotation bezel 120 may include the touch sensing device 121 that detects a touch of an occupant in the projection device 100 according to an embodiment of the disclosure. Therefore, as illustrated in FIG. 6B, when the occupant touches an image projected on the rotation bezel 120 through the projector 140, the touch sensing device 121 may detect the touch of the occupant, receive information about the position of the detected touch, and thus provide overall control to the vehicle, including control of the display panel 110.

FIG. 7 is a diagram illustrating the image 142 projected in the second mode of the projection device 100 according to an embodiment of the disclosure.

The projection device 100 may be mounted on a mounting part 20. In the projection device 100 according to an embodiment of the disclosure, the focal length of the projector 140 may be adjusted such that an image or a video projected onto the headlining of a vehicle 10 is visually recognizable to an occupant in the second mode.

To this end, the projector 140 may be adjusted such that the size and angle of an image or a video projected onto the rotation bezel 120 in the first mode are different from those of an image or a video projected onto the headlining in the second mode.

For example, the projector 140 may be tilted in the first mode or the second mode, and thus, an angle at which an image or a video is projected in the first mode or the second mode may be adjusted.

Additionally, the projection device 100 according to an embodiment of the disclosure may project an image or a video onto the headlining of the vehicle 10 through the projector 140, and the occupant may view the image or the video projected onto the headlining while lying back on a seat installed in the vehicle 10.

Figure 8:
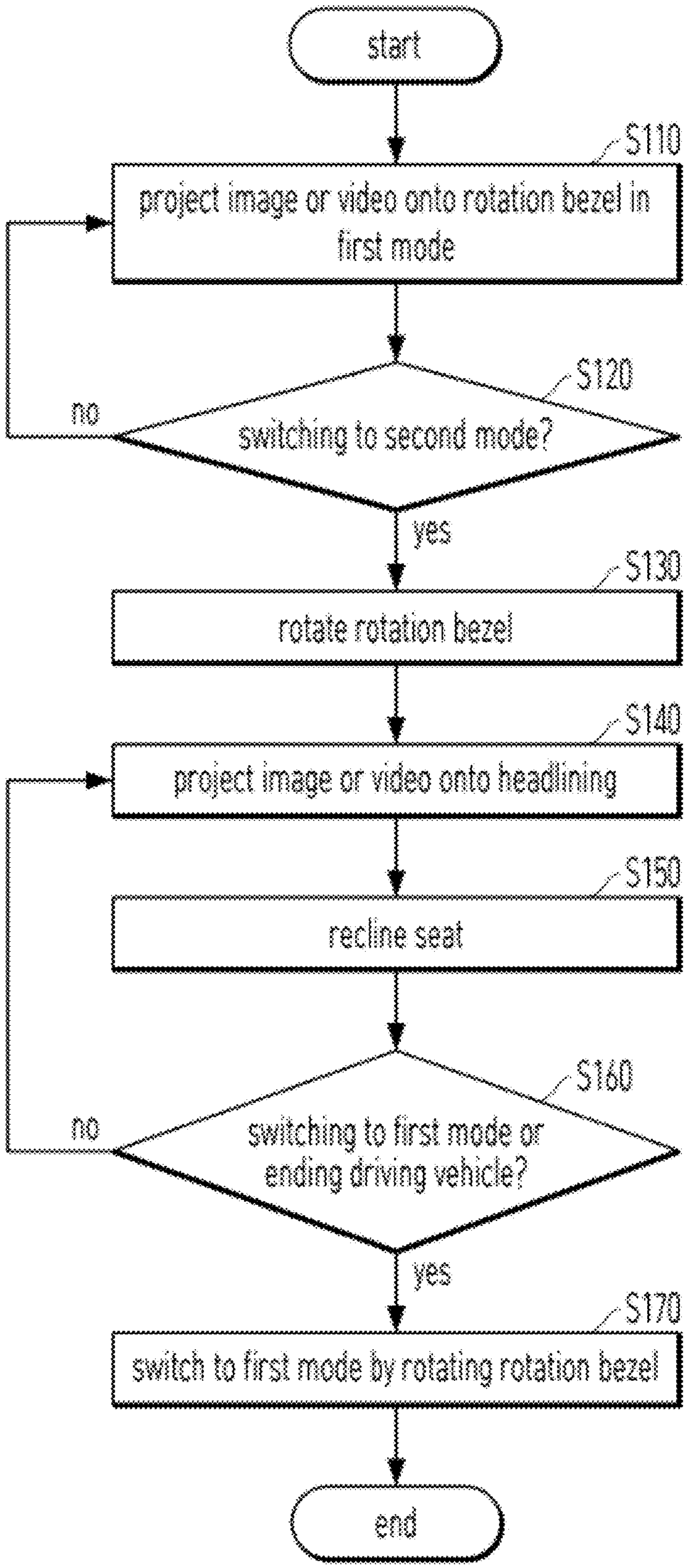
FIG. 8 is a flowchart illustrating an operation of a projection device according to an embodiment of the disclosure.

FIG. 8 is a flowchart illustrating an operation of the projection device 100 according to an embodiment of the disclosure. Hereinbelow, the following description is given in conjunction with the descriptions of FIGS. 1 to 7 in a comprehensive manner.

The projection device 100 according to an embodiment of the disclosure may set the first mode as a default mode. An image or a video may be projected onto the rotation bezel 120 through the projector 140 in the first mode (S110).

An occupant may select whether to switch to the second mode (S120). When the occupant does not want to switch to the second mode, the first mode may be maintained. When the occupant switches to the second mode, the projector 140 may be exposed by rotating the rotation bezel 120 (S130).

In the second mode, an image or a video may be projected onto the headlining of the vehicle 10 through the projector 140 (S140). Additionally, the occupant may view the image or the video projected on the headlining of the vehicle 10 by reclining a seat installed in the vehicle 10 and lying back on the seat (S150).

Further, the occupant may select whether to switch from the second mode back to the first mode or may end driving the vehicle 10 (S160). Then, when the occupant selects to switch to the first mode or ends driving the vehicle 10, the rotation bezel 120 may rotate to switch to the first mode (S170).

In summary, a projection device and a vehicle equipped with the same according to the disclosure may include a projector behind a rotation bezel positioned to divide a display panel, and project an image or a video onto the rotation bezel or a headlining of the vehicle by rotating the rotation bezel. Further, since the projector may be positioned on a mounting part of the vehicle and exposed through rotation of the rotation bezel, a projector installation space inside the vehicle may be efficiently secured.

The above detailed description is to be construed in all aspects as illustrative and not restrictive. The scope of the present disclosure should be determined by reasonable interpretation of the appended claims and all changes coming within the equivalency range of the present disclosure are intended to be embraced in the scope of the present disclosure.

What is claimed is:

1. A projection device mounted on a vehicle, comprising:
a display panel;
a rotation bezel positioned to divide the display panel;
a driving unit connected to the rotation bezel and rotating the rotation bezel; and
a projector located behind the rotation bezel and projecting an image or a video,
wherein the rotation bezel is located parallel to a front surface of the display panel in a first mode, and is bent at a predetermined angle or more with the front surface of the display panel and exposes the projector in a second mode, and
wherein the rotation bezel covers the projector in the first mode and, by being bent relative to the display panel, directly exposes the projector in the second mode.

2. The projection device of claim 1, wherein the driving unit includes:
a rotation arm having one end coupled to the rotation bezel; and
a driving motor hinged to another end of the rotation arm.

3. The projection device of claim 2, wherein the driving unit includes a guide rail engaged with the one end of the rotation arm and guiding rotation of the rotation arm.

4. The projection device of claim 1, wherein a focal length of the projector is adjusted to allow an image or a video projected onto the rotation bezel to be visually recognizable to an occupant by moving the projector forward or backward along an optical axis of the projector.

5. The projection device of claim 4, wherein the projector defines a plurality of divided areas, and projects the image or the video onto a specific area among the plurality of areas.

6. The projection device of claim 5, wherein the projector forms a black area in a remaining area except for the specific area among the plurality of divided areas.

7. The projection device of claim 1, wherein the rotation bezel includes a touch sensing device detecting a touch of an occupant.

8. The projection device of claim 1, wherein a focal length of the projector is adjusted to allow an image or a video projected onto a headlining of the vehicle to be visually recognizable to an occupant in the second mode by moving the projector forward or backward along an optical axis of the projector.

9. The projection device of claim 8, wherein the projector is adjusted to make a size and an angle of an image or a video projected onto the rotation bezel in the first mode different from a size and an angle of an image or a video projected on the headlining in the second mode.

10. A vehicle comprising:
a vehicle body;
a mounting part located on the vehicle body; and
a projection device mounted on the mounting part,
wherein the projection device includes:
a display panel;
a rotation bezel positioned to divide the display panel;
a driving unit connected to the rotation bezel and rotating the rotation bezel; and
a projector located behind the rotation bezel and projecting an image or a video,
wherein the rotation bezel is located parallel to a front surface of the display panel in a first mode, and is bent at a predetermined angle or more with the front surface of the display panel and exposes the projector in a second mode, and
wherein the rotation bezel covers the projector in the first mode and, by being bent relative to the display panel, directly exposes the projector in the second mode.

11. The vehicle of claim 10, wherein the driving unit includes:
a rotation arm having one end coupled to the rotation bezel; and
a driving motor hinged to another end of the rotation arm.

12. The vehicle of claim 11, wherein the driving unit includes a guide rail engaged with the one end of the rotation arm and guiding rotation of the rotation arm.

13. The vehicle of claim 10, wherein a focal length of the projector is adjusted to allow an image or a video projected onto the rotation bezel to be visually recognizable to an occupant by moving the projector forward or backward along an optical axis of the projector.

14. The vehicle of claim 13, wherein the projector defines a plurality of divided areas, and projects the image or the video onto a specific area among the plurality of areas.

15. The vehicle of claim 14, wherein the projector forms a black area in a remaining area except for the specific area among the plurality of divided areas.

16. The vehicle of claim 10, wherein the rotation bezel includes a touch sensing device detecting a touch of an occupant.

17. The vehicle of claim 10, wherein a focal length of the projector is adjusted to allow an image or a video projected onto a headlining of the vehicle to be visually recognizable to an occupant in the second mode by moving the projector forward or backward along an optical axis of the projector.

18. The vehicle of claim 17, wherein the projector is adjusted to make a size and an angle of an image or a video projected onto the rotation bezel in the first mode different from a size and an angle of an image or a video projected on the headlining in the second mode.

19. A projection device mounted on a vehicle, comprising:

a display panel;

a rotation bezel positioned to divide the display panel;

a driving unit connected to the rotation bezel and rotating the rotation bezel; and a projector located behind the rotation bezel and projecting an image or a video, wherein the rotation bezel is located parallel to a front surface of the display panel in a first mode, and is bent at a predetermined angle or more with the front surface of the display panel and exposes the projector in a second mode, wherein the driving unit includes:

a rotation arm having one end coupled to the rotation bezel; and a guide rail engaged with the one end of the rotation arm and guiding rotation of the rotation arm.

* * * * *